(12) United States Patent
Tritz

(10) Patent No.: US 8,567,088 B2
(45) Date of Patent: Oct. 29, 2013

(54) APPARATUS FOR DRYING HOOFS ON HOOFED ANIMALS

(76) Inventor: Donald R. Tritz, Genoa City, WI (US)

(*) Notice: Subject to any disclaimer, the term of this patent is extended or adjusted under 35 U.S.C. 154(b) by 1329 days.

(21) Appl. No.: 11/180,866

(22) Filed: Jul. 12, 2005

(65) Prior Publication Data

US 2006/0005419 A1   Jan. 12, 2006

Related U.S. Application Data

(60) Provisional application No. 60/587,271, filed on Jul. 12, 2004.

(51) Int. Cl.
*F26B 3/04* (2006.01)
*F26B 19/00* (2006.01)
*F26B 25/06* (2006.01)

(52) U.S. Cl.
USPC .......... 34/201; 34/218; 34/225; 34/226; 34/231; 34/233

(58) Field of Classification Search
USPC .......... 34/201, 209, 224, 225, 232, 233, 218, 34/222, 226, 229, 231, 237; 119/526
See application file for complete search history.

(56) References Cited

U.S. PATENT DOCUMENTS

| | | | |
|---|---|---|---|
| 4,183,323 A | 1/1980 | Maines | |
| 4,211,185 A * | 7/1980 | Karlsson | 119/526 |
| 4,258,248 A * | 3/1981 | Campo | 392/379 |
| 4,559,903 A | 12/1985 | Bloom | |
| 5,003,923 A | 4/1991 | Morgan | |
| 5,025,572 A | 6/1991 | Cordier | |
| 5,283,962 A | 2/1994 | Humann | |
| 5,416,886 A | 5/1995 | Zahler | |
| 5,613,304 A * | 3/1997 | Lin | 34/90 |
| 5,930,912 A | 8/1999 | Carder | |
| 6,058,886 A | 5/2000 | Haines | |
| 6,393,717 B1 * | 5/2002 | Santos et al. | 34/232 |
| 6,560,779 B1 | 5/2003 | Savage | |

FOREIGN PATENT DOCUMENTS

| | | |
|---|---|---|
| DE | 103 12 975 A1 | 11/2003 |
| FR | 2 258 123 A | 8/1975 |
| FR | 2 580 467 A | 10/1986 |

OTHER PUBLICATIONS

International Search Report for PCT/US2005/024,587 (2 pages).

* cited by examiner

*Primary Examiner* — Jiping Lu
(74) *Attorney, Agent, or Firm* — Lesavich High-Tech Law Group, P.C.; Stephen Lesavich

(57) ABSTRACT

A hoof drying apparatus. The hoof drying apparatus is specifically sized and shaped to accommodate one or more hoofs of a hoofed animal and dries a bottom, side and top portion of a hoof from the bottom up. The hoof drying apparatus is portable and specifically designed, but is not limited to, drying hooves for the purposes of: hoof wall repair, preparation for medication for hoof diseases and preparation of the hoof for application of hoof dressings and hoof shoes. The hoof drying apparatus can also be used for drying non-hoofed animals.

16 Claims, 8 Drawing Sheets

# US 8,567,088 B2

APPARATUS FOR DRYING HOOFS ON HOOFED ANIMALS

CROSS REFERENCES TO RELATED APPLICATIONS

This application claims priority to U.S. Provisional Patent Application 60/587,271, filed, Jul. 12, 2004, the contents of which are incorporated by reference.

FIELD OF THE INVENTION

This invention relates to drying apparatus. More specifically, it relates to an apparatus for drying hoofs of hoofed animals.

BACKGROUND OF THE INVENTION

Many animals such as horses and cows have hooves. For example, a typical horse hoof comprises three parts, the sole, wall and frog.

The "sole" holds the weight of a horse. The sole is connected to the hoof wall.

The "hoof wall" is formed at a corner of the sole where skin like cells mix with horny tissue to form a hard hoof wall. The hoof wall has a inner layer of laminae which locks together with a second set of laminae. The second set of laminae is attached to the pedal bone and holds the hoof firmly in place.

At the horse's heel, the hoof wall turns inward toward the "frog." The frog forms the bars of the foot, which slightly gives when the horse makes contact with the ground, absorbing some of the impact. A well shaped frog touches the ground when a horse moves.

A horse hoof is comprised of a large percentage of water and are similar in hardness and texture to human fingernails. Horse hooves typically reflect their environment. Wet conditions produce soft hoof walls. Dry conditions produce hard hoof walls and dirty conditions produce unhealthy hooves.

Horses in their natural environment care for their own hooves during their constant ranging for forage. Horses in captivity typically require hoof care by their owners. Such hoof care typically includes scrapping and shaving, applying "horse shoes," applying medicines, etc.

It is difficult to apply horse shoes to wet horse hoofs since horse hooves can become "mushy" much like human fingernails after prolonged soaking, leading to less rigidity in the hoof wall. This can cause shoes to loosen due to the tendency for the clinches to pull through or "pop." This also can lead to a tearing of the hoof wall, making re-application of the shoes more difficult.

Excess flexibility of the hoof wall due to wet hooves can lead to the foot spreading out over the sides of the horse shoe. This results in a loss of support and potential for lameness or injury.

Excessively wet or soft hooves are more sensitive making them more difficult to shoe. Sensitive hoofs lead to soreness, bruising, and lameness when the horse is worked on hard ground or over stones.

Horse hooves often need to be quickly dried for example, for hoof wall repair, preparation for medication for hoof diseases such as thrush and white-line disease, and preparation of the hoof for application of hoof dressings.

There is a need to quickly and efficiently dry horse hooves for these and many other reasons. However, there are many problems associated with dryers for horse hoofs know in the art. One problem is that most dyers known in the art are not specifically designed or suited to drying horse hoofs or the hoofs of other hoofed animals. Another problem is that such dyers often scare or spook horses and other hoofed animals.

Another problem is that such dryers are typically used around and on top of a hoof and do not dry hoofs from underneath or from the bottom to the top. Another problem is that such dryers typically do not allow a hoofed animal insert a hoof into the drying apparatus. Another problem is that such dryers are not portable.

Thus, it is desirable to provide a dyer to dry the hoofs of hoofed animals that solves one or more of the described problems.

SUMMARY OF THE INVENTION

In accordance with preferred embodiments of the present invention, some of the problems associated with drying the hoofs of hoofed animals are overcome. An apparatus for drying hoofs on hoofed animals is presented.

The hoof drying apparatus is specifically sized and shaped to accommodate one or more hoofs of a hoofed animal and to thoroughly dry a bottom, side and top portion of a hoof from the bottom to the top. The hoof drying apparatus is specifically designed, but is not limited to accommodate hoofed animals such as horses, cows, buffalo, antelope, etc. prevent a variety of problems and improve the general health of the hoofed animal. The hoof drying apparatus can also be used for non-hoofed animals.

The foregoing and other features and advantages of preferred embodiments of the present invention will be more readily apparent from the following detailed description. The detailed description proceeds with references to the accompanying drawings.

BRIEF DESCRIPTION OF THE DRAWINGS

Preferred embodiments of the present invention are described with reference to the following drawings, wherein.

DETAILED DESCRIPTION OF THE INVENTION

Figure 1:
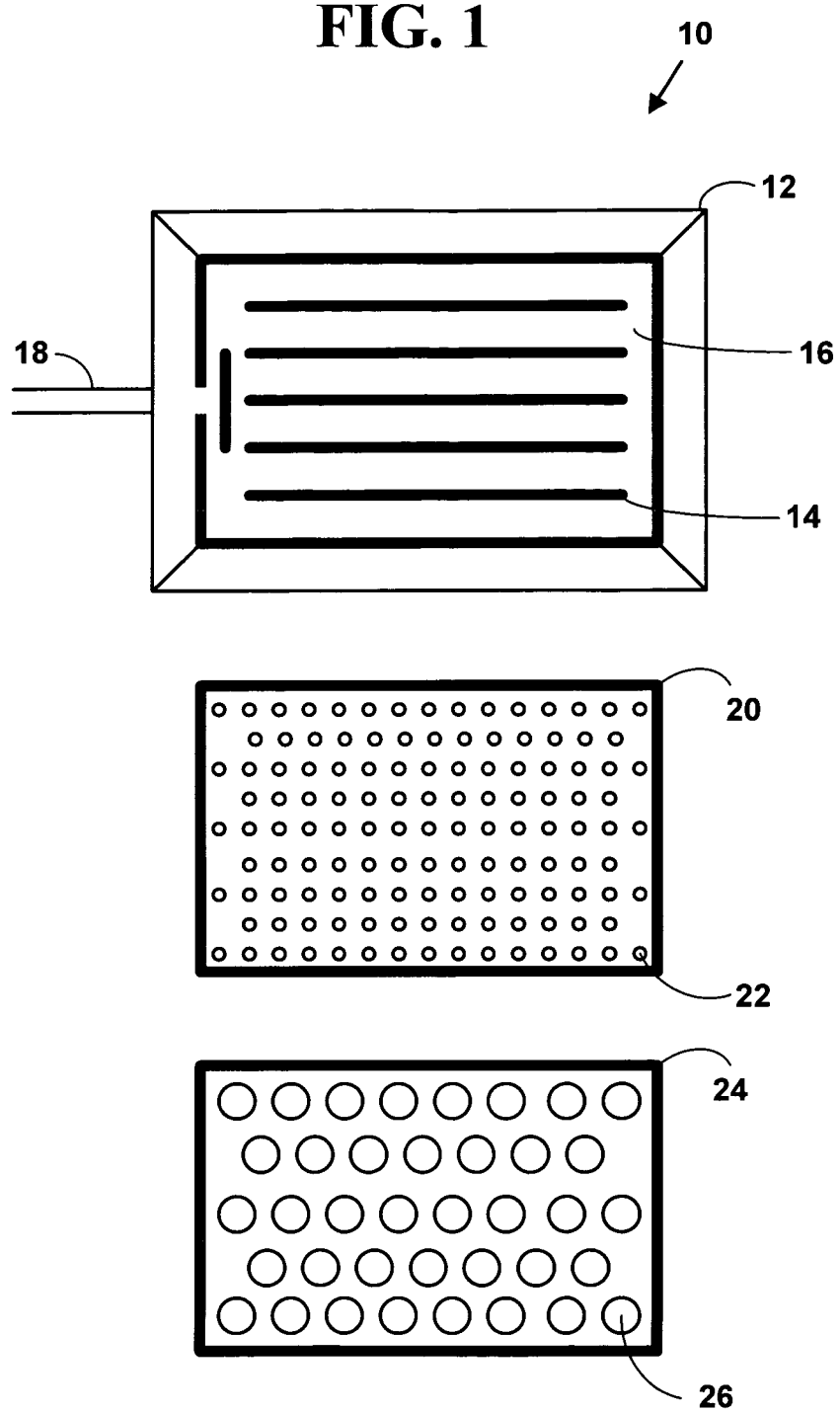
FIG. 1 is a block diagram illustrating a exploded top view of a hoof drying apparatus.

FIG. 1 is a block diagram illustrating an exploded top view of a hoof drying apparatus 10. The hoof drying apparatus 10 comprises a raised based platform 12. In one embodiment of the invention, the raised based platform 12 is about thirty-six inches long and about eighteen inches deep and about four inches high. The length, width and height are specifically selected and sized to accommodate either one or more hoofs from a hoofed animal such as a horse, cow, buffalo, antelope, etc. However, the present invention is not limited to such measurements and raised base platforms 12 of other measurements can be used to practice the invention.

The present invention can also be used with non-hoofed animals such as dogs, cats, and other small animals. In such an embodiment, the whole non-hoofed animal is placed in the raised based platform 12.

In one embodiment of the invention, the raised base platform 12 comprises a rigid rubberized material. However, the present invention is not limited to such an embodiment and other materials such as plastic, metals, composite materials, mylar and wood can be used for the raised base platform 12.

The raided base platform 12 is raised and is designed to have a raised height to allow a hoof of hoofed animal to be dried in wet conditions, and even in standing water, deep mud, etc. if necessary.

The raised base platform 12 comprises plural air chamber dividers 14 placed in a first space 16. The plural air chamber dividers 14 direct air into the raised base platform 12 from a hollow air connecter 18 in the first space 16. In one embodiment of the invention the plural air chamber dividers 14 have a width and depth of approximately one inch and are rigid. The length is sized to fit within the first space 16 and is variable and dependent of the size of the first space. However, the present invention is not limited to such measurements and plural air chambers 14 of other measurements can be used to practice the invention.

In one embodiment of the invention, the plural air chamber dividers 14 comprise a rigid rubberized material. The rigid rubberized material is capable of support the weight of a heavy hoofed animal without collapsing. However, the present invention is not limited to such an embodiment and other materials such as plastic, metals, composite materials and wood can be used for the plural air chamber dividers 14.

In one embodiment of the invention, the plural air chambers dividers 14 are configurable by a user for multiple types of sized and shaped hoofs of hoofed animals. In such an embodiment, the plural air chamber dividers 14 further include protruding pins that are inserted in pre-drilled holes in the raised base platform 12 to direct drying airflow for a specific size and type of hoofed animal.

In another embodiment of the invention, the plural air chamber dividers 14 are not configurable and installed during manufacturing. In such an embodiment, the hoof drying apparatus 10 would be purchased to dry hoofs of a specific type of hoofed animal (e.g., a horse, cow, buffalo, antelope, an adult animal, a non-adult animal, etc.).

The hoof drying apparatus 10 with the plural air chamber dividers 14 is specifically sized and shaped to accommodate one or more hoofs of a hoofed animal and to thoroughly dry a bottom, one or more side portions and top portion of a hoof from the bottom to the top, therefore thoroughly drying the hoof.

In one embodiment of the invention, the hollow air container 18 is a rigid plastic material. However, the present invention is not limited to such an embodiment and other materials such as rubbers, metals, composite materials and wood can be used for the hollow air container 18. The hollow air container 18 allows an external drying device to be attached to the hoof drying apparatus 10.

The hoof drying apparatus 10 further comprises a first air mat 20 with plural openings of a first size 22. The dimension of the first air mat 20 specifically selected and sized to fit into the first inner space 16 and cover the plural air chamber dividers 14. The plural openings of a first size 22 include, circular, diamond, hexagon, octagon or other shaped openings.

In one embodiment of the invention, the first air mat 20 comprises a flexible rubberized material. The flexible rubberized material is capable of support the weight of a hoofed animal and is soft and flexible. The soft and flexible materials are compressible by the hoofed animal when their weight is applied. The soft and flexible materials allow the hoofs of a hoofed animal with sensitive or diseased hoofs to be dried without pain. However, the present invention is not limited to such an embodiment and other materials such as plastic, metals, composite materials and wood can be used for the first air mat 20.

The hoof drying apparatus 10 further comprises a second air mat 24 with plural openings of a second size 26. The dimension of the second air mat 24 are also specifically selected and sized to fit into the first inner space 16 and aligned to cover selected ones of the plural air openings of the first size. The plural openings of the second size 26 include, circular, diamond, hexagon, octagon or other shaped openings. For example, in one embodiment, the plural air openings of the second size are aligned to include one or more air openings of the first size.

In one embodiment of the invention, the plural openings of the second size 26 are larger than the plural openings of the first size 22. The plural openings of the second size 26 overlap one or more openings of the first size 22. In another embodiment, the plural openings of the second size 26 are smaller than the plural openings of the first size 22. In such an embodiment, the plural openings of the first size 22 overlap one or more openings of the second size 26.

In either embodiment, the plural openings of different sizes provide an additional "air cushion" and "drying air current" for the hoofed animal as drying air is forced through and between the different sized openings.

As is known in the mechanical arts, when air is forced out of a smaller sized hole (where the pressure is lower) into a larger size hole (where the pressure is higher) a faster flow from the smaller hole size is transformed into slower flow at the larger hole. Conversely, when air is forced out of a large sized hole into a smaller size hole a slower flow at the larger hole is transformed into a faster flow at the smaller hole. Changes in flow through different size holes also changes the temperature of the air.

In one embodiment of the invention, the change in size from the smaller holes in the first air mat 20 to the larger hole size in the second air mat 24 also changes the air flow speed and pressure (i.e., slower speed, higher pressure) which helps to dry hoofs quicker.

In another embodiment of the invention, the change in size from larger holes in the first air mat 20 to smaller hole size the second air mat 24 also changes the air flow speed and pressure (i.e., faster speed, lower pressure) which helps to dry hoofs quicker.

In another embodiment of the invention, the plural openings of the second size 26 are the same size as the plural openings of the first size 22. The plural openings of the second size 26 directly overlap one or more plural openings of the first size 22.

In one embodiment of the invention, the second air mat 24 comprises a flexible rubberized material. The flexible rubberized material is capable of supporting the weight of a hoofed animal and is soft and flexible. However, the present invention is not limited to such an embodiment and other materials such as plastic, metals, composite materials and wood can be used for the second air mat 24.

In one embodiment of the invention, the hoof drying apparatus 10 includes both the first air mat 20 and the second air mat 24. In another embodiment of the invention, the hoof drying apparatus 10 includes only the first air mat 20. In yet another embodiment of the invention, the hoof drying apparatus 10 includes only the second air mat 24.

In another embodiment, the first air mar 20 and the second air mat 24 are combined into a single combination air mat comprising plural sets of holes of two different sizes. In such an embodiment, the combination air mat includes a first layer with holes of a first size and a size layer with holes of a second size.

In another embodiment, the raised base platform 12, first air mat 20 and/or the second air mat 24 include magnetic materials and/or plural embedded magnets. As is known in the animal arts, magnetic therapy is used to treat many ailments. General uses of magnetic therapy include relief of pain and discomfort, reduction of inflammation, improved circulation, the ability to fight infections and acceleration of healing. The magnetic materials are used to help treat hoof ailments, if any, while one or more hoofs are being dried. However, the present invention is not limited to these embodiments and the invention can be practiced without magnetic materials for embedded magnets.

In another embodiment, only one air mat with plural layers is used. A first layer includes a plural openings of a first size placed on top of the plural of air chamber dividers 14 in the raised based platform and a second layer with a plural openings of a second size are aligned on top of the plural openings of the second size. The second size is different from the first size.

The hoof drying apparatus 10 allows a hoof from a hoofed animal to be dried completely including a bottom, side and top portion of a hoof. The components of the hoof drying apparatus 10 direct air flow to completely dry one or more hoofs that are placed upon the hoof dryer 10.

Figure 2:
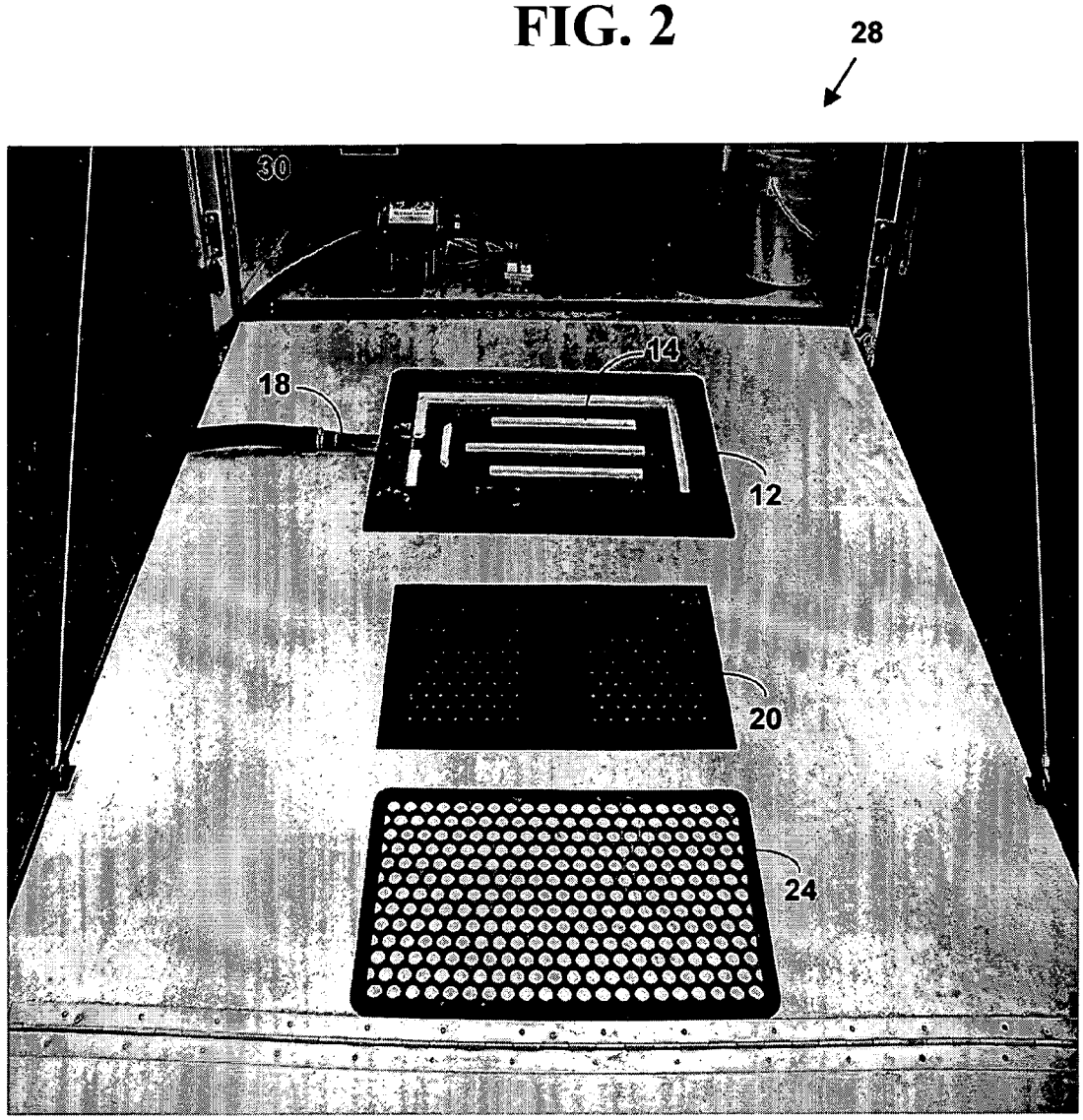
FIG. 2 is a block diagram of a photograph of an exploded top view of the hoof drying apparatus of FIG. 1.

FIG. 2 is a block diagram of a photograph of an exploded top view 28 of the hoof drying apparatus of FIG. 1.

Figure 3:
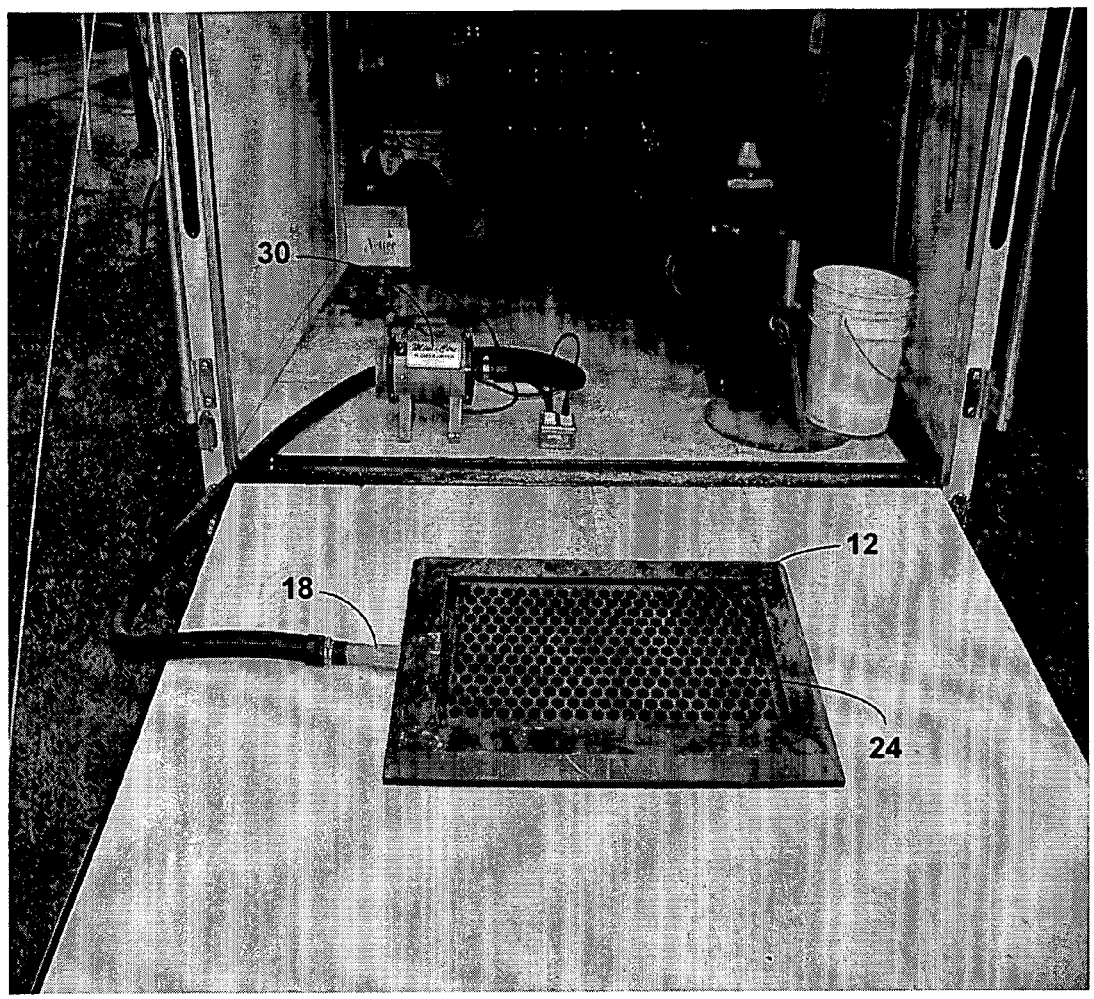
FIG. 3 is a block diagram of a photograph of a non-exploded top view of the hoof drying apparatus of FIG. 1.

FIG. 3 is a block diagram of a photograph of a non-exploded top view 32 of the hoof drying apparatus 10 of FIG. 1.

In FIG. 3, the components described for FIG. 1 are placed together in their respective places and ready for use to dry the hoofs of a hoofed animal such as a horse, cow, buffalo, antelope, etc. FIGS. 2 and 3 illustrate an external drying device 30 that is capable of blowing hot, warm, cool or cold air into the hollow air connecter 18 in the first space 16. The air from the external drying device 30 is directed by the plural air chamber dividers 14 into the first space 16 and subsequently through the plural openings of the first size 22 in the first air mat 20 and the plural openings of the second size 26 in the second air mat 24.

In FIGS. 2 and 3, the external drying device 30 includes an electronic dryer. However, the external drying device 30 can also include a manual drying device such as a hand-operable device (e.g., a hand-pump, etc.).

FIG. 2 and FIG. 3 illustrate a hoof drying apparatus 10 illustrating components 12, 20 and 24 comprising the rigid and flexible rubberized materials as described above for FIG. 1 above. However, the present invention is not limited to such an embodiment and other materials such as plastic, metals, and wood can be used for the hoof dryer 10.

FIG. 3 illustrates use of the hoof drying apparatus 10 in a trailer of a farrier (i.e., a professional "horse shoer"). FIG. 3 illustrates a hoof drying apparatus 10 that was specifically sized and shaped to accommodate two hoofs of a specific sized horse simultaneously. For example, two hoofs of the two back or front legs of a horse can be placed simultaneously on the hoof dryer 10. However, the present invention is not limited to such an embodiment and the hoof drying apparatus 10 can be specifically sized and shaped to accommodate, more (e.g., all four) or fewer (e.g., one) of a hoofed animal.

Figure 4:
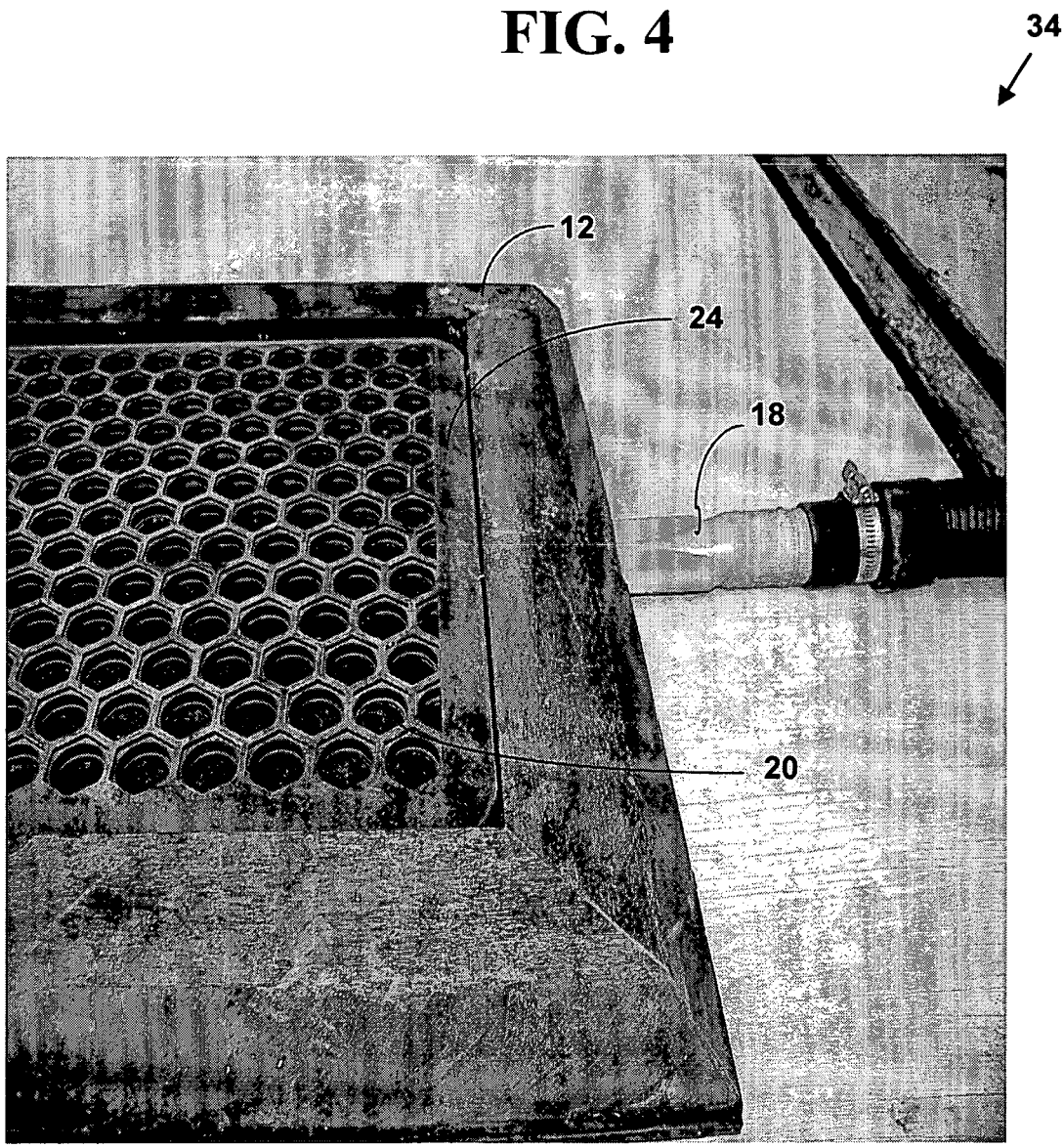
FIG. 4 is a block diagram of a photograph of a portion of a top view a hoof drying apparatus of FIG. 1.

FIG. 4 is a block diagram of a photograph of a close-up portion of a top view 34 a hoof drying apparatus 10 of FIG. 1.

Figure 5:
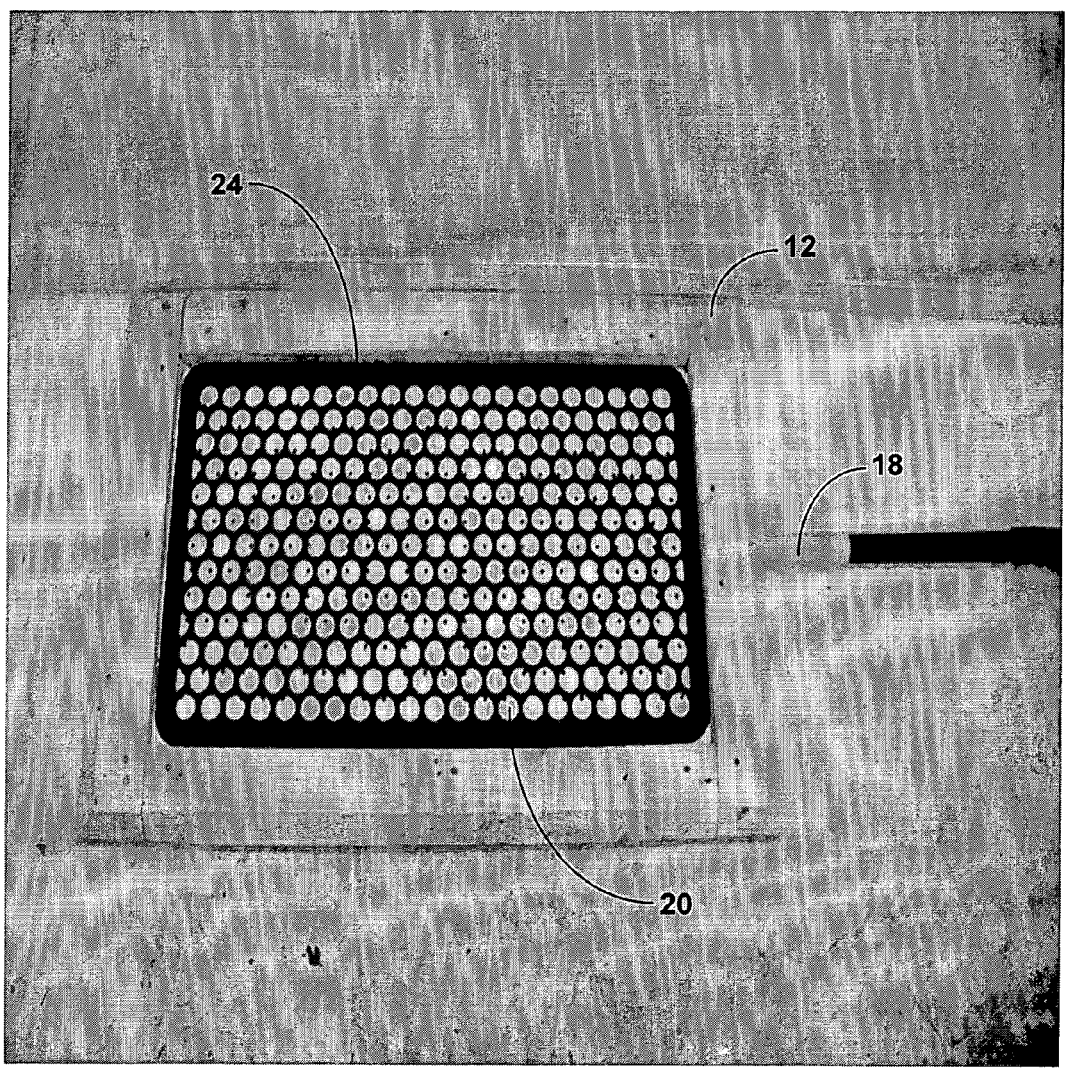
FIG. 5 is a block diagram of a photograph of a top view of the hoof drying apparatus of FIG. 1 comprising components of other materials.

FIG. 5 is a block diagram of a photograph of a top view 36 of a hoof drying apparatus 10 of FIG. 1 comprising components of other materials. These materials are different than those used for FIG. 2.

In FIG. 5, the raised platform 12 comprises wood, the first air mat 20 comprises a hard myler or Formica type material and the second air mat 24 comprises a flexible rubberized material. This embodiment is exemplary only and the present invention is not limited to this embodiment. Various combinations of various types of materials can be used to practice the invention.

Figure 6:
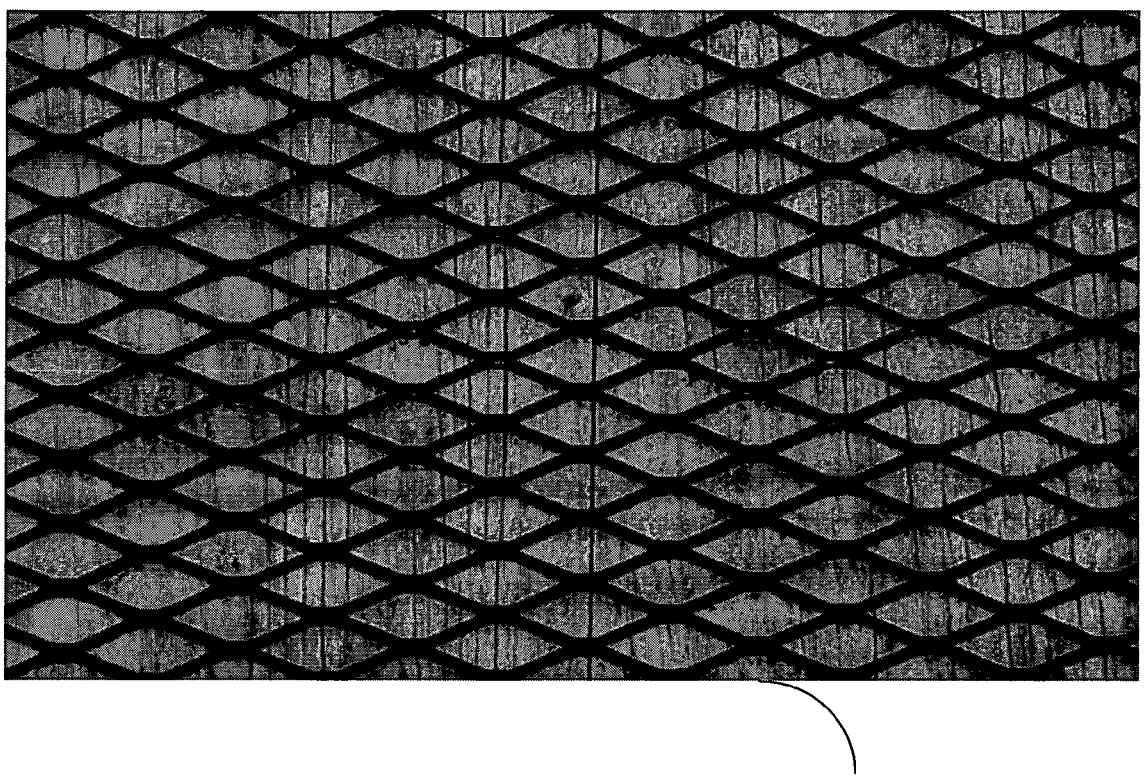
FIG. 6 is a block diagram of a photograph of a top view of a first air mat made out of expanded metal.

FIG. 6 is a block diagram of a photograph of a top view 38 of a first air mat 20 made out of expanded metal. As is known in the art, "expanded metal" is metal in which holes are punched and then the metal is stretched to expand the holes. This embodiment is exemplary only and the present invention is not limited to this embodiment.

Figure 7:
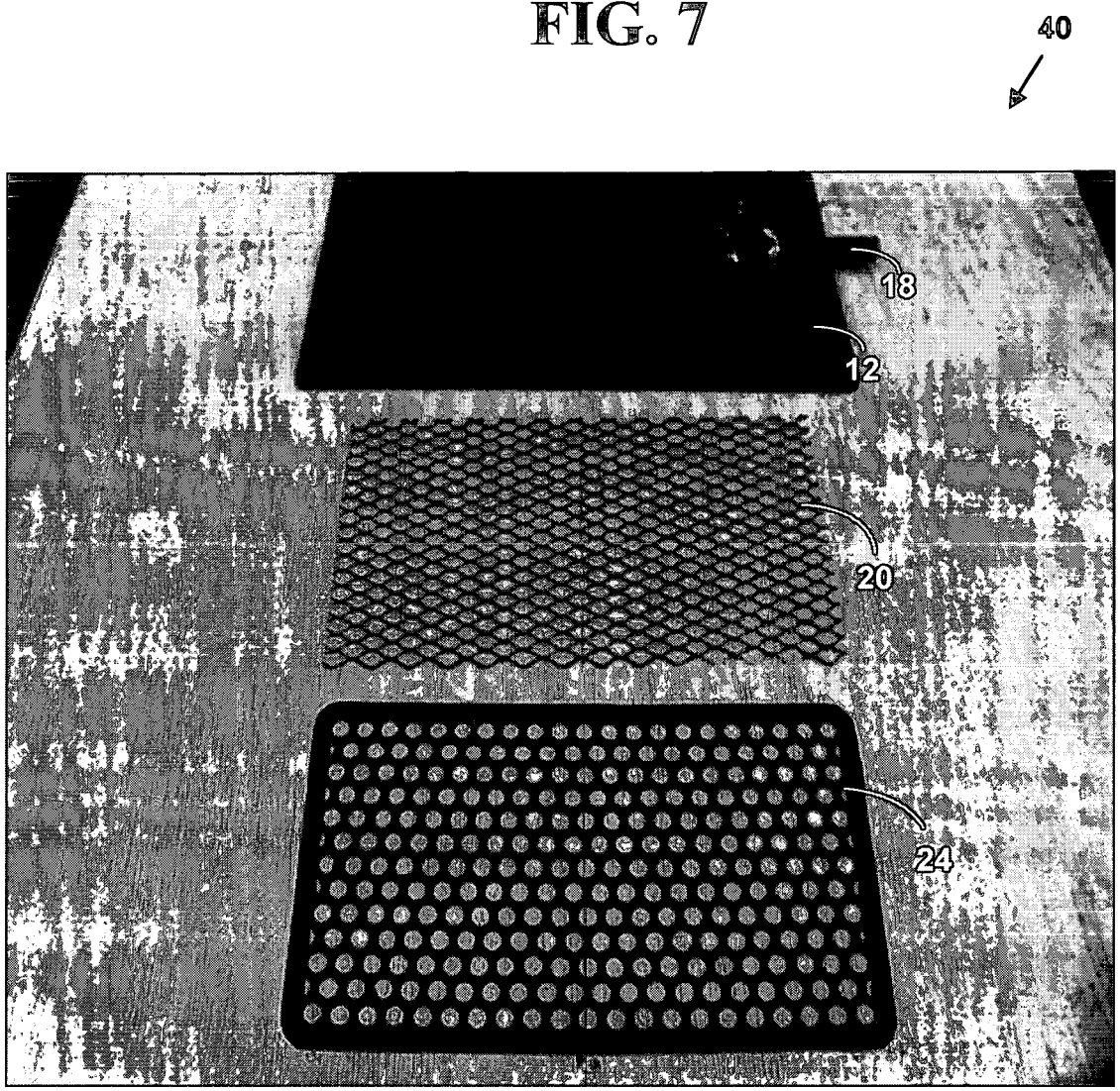
FIG. 7 is a block diagram of a photograph of a exploded top view of the hoof drying apparatus 10 of FIG. 1.

FIG. 7 is a block diagram of a photograph of an expanded top view 40 of the hoof drying apparatus 10 of FIG. 1.

In FIG. 7 the raised platform 12 comprises a rubberize material, the first air mat 20 comprises an expanded metal material and the second air mat 24 comprises a flexible rubberized material. This embodiment is exemplary only and the present invention is not limited to this embodiment. Various combinations of various types of materials can be used to practice the invention.

Figure 8:
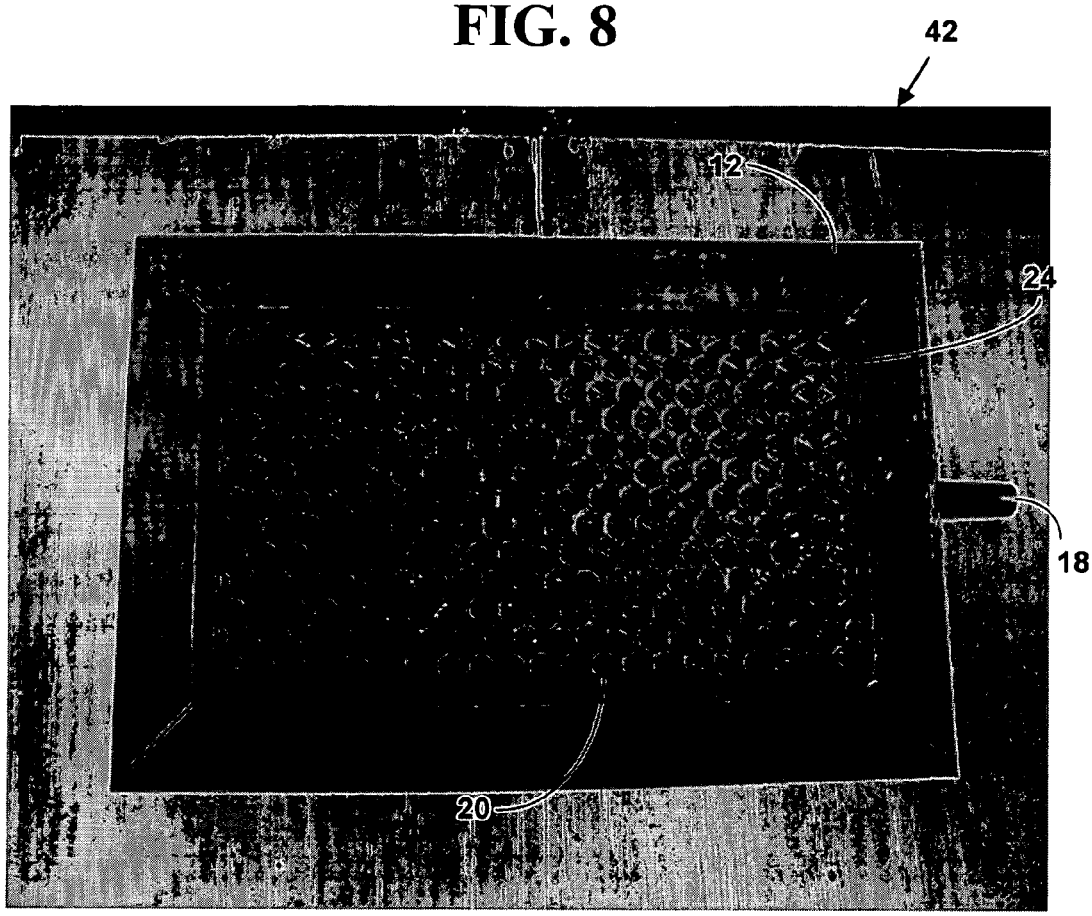
FIG. 8 is a block diagram of a photograph of a non-exploded top view of the hoof drying apparatus of FIG. 1 comprising components of other materials.

FIG. 8 is a block diagram of a photograph of a non-exploded top view 42 of a hoof drying apparatus 10 of FIG. 1 comprising components of other materials. These materials are different than those used for FIG. 2.

In FIG. 8, the raised platform 12 comprises a rubberize material, the first air mat 20 comprises an expanded metal material and the second air mat 24 comprises a flexible rubberized material. This embodiment is exemplary only and the present invention is not limited to this embodiment. Various combinations of various types of materials can be used to practice the invention.

The hoof drying apparatus 10 is specifically sized and shaped to accommodate one or more hoofs of a hoofed animal. The hoof drying apparatus 10 is also designed to dry hooves for the purposes of: hoof wall repair, preparation for medication for hoof diseases and preparation of the hoof for application of hoof dressings and hoof shoes.

In one embodiment of the invention, the hoof drying apparatus 10 is portable and specifically designed and sized to accommodate either one, two or four hoofs a horse or other hoofed animal. The hoof drying apparatus 10 is used by a blacksmith or a farrier to dry hoofs before the horse is shoed.

In another embodiment of the invention, the hoof drying apparatus 10 is used by veterinarians to dry the hoofs of hoofed animals before applying medications.

In another embodiment of the invention, the hoof drying apparatus 10 is not portable is used in a fixed structure such as a barn, farrier shop, veterinary clinic, etc. In such an embodiment, the hoof drying apparatus 10 is permanently mounted to a floor.

In the embodiments illustrated, the hoof drying apparatus 10 is illustrated as rectangular in shape. However, the present invention is not limited to rectangular shapes and other shapes can also be used to practice the invention (e.g., square, circular, triangular, etc).

It should be understood that the components described herein are not related or limited to any particular type of materials unless indicated otherwise. Various combinations of general purpose, specialized or equivalent materials and components and combinations thereof may be used with or perform operations in accordance with the teachings described herein.

In view of the wide variety of embodiments to which the principles of the present invention can be applied, it should be understood that the illustrated embodiments are exemplary only, and should not be taken as limiting the scope of the present invention. For example, the steps of the flow diagrams may be taken in sequences other than those described, and more fewer or equivalent elements may be used in the block diagrams.

While various elements of the preferred embodiments have been described as being implemented with certain components and materials, in other embodiments other implementations and/or combinations or components and materials may alternatively be used, and vice-versa.

The claims should not be read as limited to the described order or elements unless stated to that effect. In addition, use of the term "means" in any claim is intended to invoke 35 U.S.C. §112, paragraph 6, and any claim without the word "means" is not so intended.

Therefore, all embodiments that come within the scope and spirit of the following claims and equivalents thereto are claimed as the invention.

I claim:

1. A hoof drying apparatus, comprising in combination:
a raised base platform including a plurality of air chamber dividers included therein for directing a drying air flow, wherein the height of the raised base platform is specifically sized to allow easy step access by a hoofed animal, wherein the plurality of air chambers dividers are configurable by a user for use for multiple types of sized and shaped hoofs of hoofed animals and wherein the plurality of air chamber dividers comprise a rigid rubberized material, wherein the rigid rubberized material is capable of supporting weight of a heavy hoofed animal without collapsing;
an hollow air connector connected through a portion of the raised based platform, wherein a first end outside the raised based platform is connected to a drying air source and a second end inside the raised based platform directs drying air into the plurality of air chambers;
a first air mat with a plurality of openings of a first size placed on top of the plurality of air chamber dividers in the raised based platform; and
a second air mat with a plurality of openings of a second size placed on top of the first air mat, wherein the second size is different from the first size, wherein selected ones of the plurality of openings of the second size align with one or more of the plurality of openings of the first size, wherein the length and width of the first air mat and the second air mat are specifically sized and shaped to accommodate one or more hoofs from a hoofed animal, wherein the second air mat comprises a compressible material that is compressible by the hoofed animal when weight of the hoofed animal is applied to the one or more hoofs thereby providing a surface that is comfortable for hoofed animal as the one or more hoofs are dried and particularly when one or more hoofs are sensitive or diseased,
wherein the drying air flow is directed into the plurality of air chamber dividers, through the plurality of openings in the first air mat and through the plurality of openings in the second air mat to dry a bottom portion, one or more side portions and a top portion of one or more hoofs that are placed upon the second air mat in the raised base platform,
wherein directing the drying air flow through the plurality of openings in the first air mat and through the plurality of openings in the second air mat changes a speed and a pressure of the drying air flow, thereby providing an additional drying air current as drying air is forced through and between the different sized openings, and
wherein the first air mat and the second air mat includes a flexible rubberized material, wherein the flexible rubberized material is easily compressible when weight is applied by a hoofed animal, thereby allowing one or more hoofs of a hoofed animal with sensitive or diseased hoofs to be dried with reduced pain and wherein the hoof drying apparatus is portable.

2. The hoof drying apparatus of claim 1 further comprising a drying air source connected to the first end of the hollow air connector.

3. The hoof drying apparatus of claim 1 wherein the plurality of openings of the second size are larger than the plurality of openings of the first size.

4. The hoof drying apparatus of claim 1 wherein the plurality of openings of the second size are smaller than the plurality of openings of the first size.

5. The hoof drying apparatus of claim 4 wherein the plurality of openings of the first size force a portion of the drying air flow into the plurality of openings of the second size thereby creating an additional drying air flow current.

6. The hoof drying apparatus of claim 1 wherein the raised base platform comprises materials including a rigid rubberized material, plastic, metal, composite material, mylar or wood.

7. The hoof drying apparatus of claim 1 wherein the raised based platform, the first air mat, or the second air mat comprise magnetic materials or a plurality of embedded magnets.

8. The hoof drying apparatus of claim 1 wherein an additional air cushion and drying air flow current is created as the drying air is forced out of a plurality of smaller size openings of the first size in the first air mat into a plurality of larger size openings of the second size on the second air mat, thereby providing a drying air flow current with a slower speed and a higher pressure.

9. The hoof drying apparatus of claim 1 wherein an additional air cushion and drying air flow current is created as the drying air is forced out of a plurality of larger size openings of the first size in the first air mat into a plurality of smaller size openings of the second size on the second air mat, thereby providing a drying air flow current with a faster speed and a lower pressure.

10. The hoof drying apparatus of claim 1 wherein the one or more hoofs include one or more hoofs from a horse, cow, buffalo or antelope.

11. The hoof drying apparatus of claim 1 wherein the hoof drying apparatus is used to dry a non-hoofed animal that fits within the raised base platform.

12. The hoof drying apparatus of claim 1 wherein the plurality of air chambers are selectively removable and moveable to a plurality of different positions within the raised base platform.

13. A hoof drying apparatus, comprising in combination:
a raised base platform including a plurality of air chamber dividers included therein for directing a drying air flow, wherein the height of the raised base platform is specifically sized to allow easy step access by a hoofed animal, wherein the plurality of air chambers dividers are configurable by a user for use for multiple types of sized and shaped hoofs of hoofed animals, wherein the plurality of air chamber dividers comprise a rigid rubberized material, wherein the rigid rubberized material is capable of supporting weight of a heavy hoofed animal without collapsing;

an hollow air connector connected through a portion of the raised based platform, wherein a first end outside the raised based platform is connected to a drying air source and a second end inside the raised based platform directs drying air into the plurality of air chambers;

an air mat with a plurality of layers, wherein a first layer includes a plurality of openings of a first size placed on top of the plurality of air chamber dividers in the raised based platform and a second layer with a plurality of openings of a second size aligned on top of the plurality of openings of the second size, wherein the second size is different from the first size, and wherein the second layer accepts one or more hoofs from a hoofed animal, wherein the length and width of the air mat are specifically sized and shaped to accommodate one or more hoofs from a hoofed animal, wherein the first layer comprises an expanded metal material and the second layer comprises a compressible material that is compressible by the hoofed animal when weight of the hoofed animal is applied to the one or more hoofs thereby providing a surface that is comfortable for hoofed animal as the one or more hoofs are dried, particularly when one or more of the hoofs are sensitive or diseased, wherein the drying air flow is directed into the plurality of air chamber dividers, through the plurality of openings of the first size and through the plurality of openings of the second size to dry a bottom portion, one or more side portions and a top portion of one or more hoofs that are placed upon the air mat in the raised base platform, wherein directing the drying air flow through the plurality of openings in the first air mat and through the plurality of openings in the second air mat changes a speed and pressure of the drying air flow, thereby providing an additional drying air current as drying air is forced through and between the different sized openings, and wherein the hoof drying apparatus is portable.

14. The hoof drying apparatus of claim 13 wherein the one or more hoofs include one or more hoofs from a horse, cow, buffalo or antelope.

15. A hoof drying apparatus, comprising in combination:
a base means for directing a drying air flow including a plurality of air chamber dividers included therein, wherein the height of the base means is specifically sized to allow easy step access by a hoofed animal, wherein the plurality of air chambers dividers are configurable by a user for use for multiple types of sized and shaped hoofs of hoofed animals, wherein the plurality of air chamber dividers comprise a rigid rubberized material, wherein the rigid rubberized material is capable of supporting weight of a heavy hoofed animal without collapsing;
a drying air flow connector means for directing the drying air flow connected through a portion of the base means, wherein a first end outside base means is connected to the drying air source and a second end inside the connector means directs drying air into the plurality of air chambers;
a first drying means for directing the drying air flow with a plurality of openings of a first size placed on top of the plurality of air chamber dividers in the base means; and
a second drying means for directing for the drying air flow with a plurality of openings of a second size placed on top of the first drying means, wherein the second size is different from the first size, wherein the length and width of the first drying means and the second drying means are specifically sized and shaped to accommodate one or more hoofs from a hoofed animal, wherein the first drying means comprises an expanded metal material, and wherein the second drying means comprises a compressible material that is compressible by the hoofed animal when weight of the hoofed animal is applied to the one or more hoofs thereby providing a surface that is comfortable for hoofed animal as the one or more hoofs are dried, particularly when one or more of the hoofs are sensitive or diseased, wherein the drying air flow is directed into the plurality of air chamber dividers, through the plurality of openings in the first drying means and through the plurality of openings in the second drying means to dry a bottom portion, one or more side portions and a top portion of one or more hoofs that are placed upon the second drying means in the raised base platform, wherein directing the drying air flow through the plurality of openings in the first drying means and through the plurality of openings in the second drying means changes a speed and a pressure of the drying air flow, thereby providing an additional drying air current as drying air is forced through and between the different sized openings pain and wherein the hoof drying apparatus is portable.

16. A hoof drying apparatus, comprising in combination:
a base means for directing a drying air flow including a plurality of air chamber dividers included therein, wherein the height of the base means is specifically sized to allow easy step access by a hoofed animal, wherein the plurality of air chambers dividers are configurable by a user for use for multiple types of sized and shaped hoofs of hoofed animals, wherein the plurality of air chamber dividers comprise a rigid rubberized material, wherein the rigid rubberized material is capable of supporting weight of a heavy hoofed animal without collapsing;
a drying air flow connector means for directing the drying air flow connected through a portion of the base means, wherein a first end outside base means is connected to the drying air source and a second end inside the connector means directs drying air into the plurality of air chambers;
a drying means with a first layer for directing the drying air flow with a plurality of openings of a first size placed on top of the plurality of air chamber dividers in the base means and a second layer for directing for the drying air flow with a plurality of openings of a second size placed on top of the first layer, wherein the second size is different from the first size, wherein the length and width of the drying means is specifically sized and shaped to accommodate one or more hoofs from a hoofed animal, wherein the first layer and the second layer comprise a compressible material that is compressible by the hoofed animal when weight of the hoofed animal is applied to the one or more hoofs thereby providing a surface that is comfortable for hoofed animal as the one or more hoofs are dried, particularly when one or more of the hoofs are sensitive or diseased, wherein the drying air flow is directed into the plurality of air chamber dividers, through the plurality of openings in the first layer and through the plurality of openings in the second layer to dry a bottom portion, one or more side portions and a top portion of one or more hoofs that are placed upon the second drying means in the raised base platform, and wherein directing the drying air flow through the plurality of openings in the first layer and through the plurality of openings in the second layer changes a speed and a pressure of the drying air flow, thereby providing an additional drying air current as drying air is forced through and between the different sized openings pain and wherein the hoof drying apparatus is portable.

* * * * *